Jan. 19, 1943.　　　R. L. KUSS　　　2,308,967
BUSHING
Filed March 1, 1941　　　2 Sheets-Sheet 1
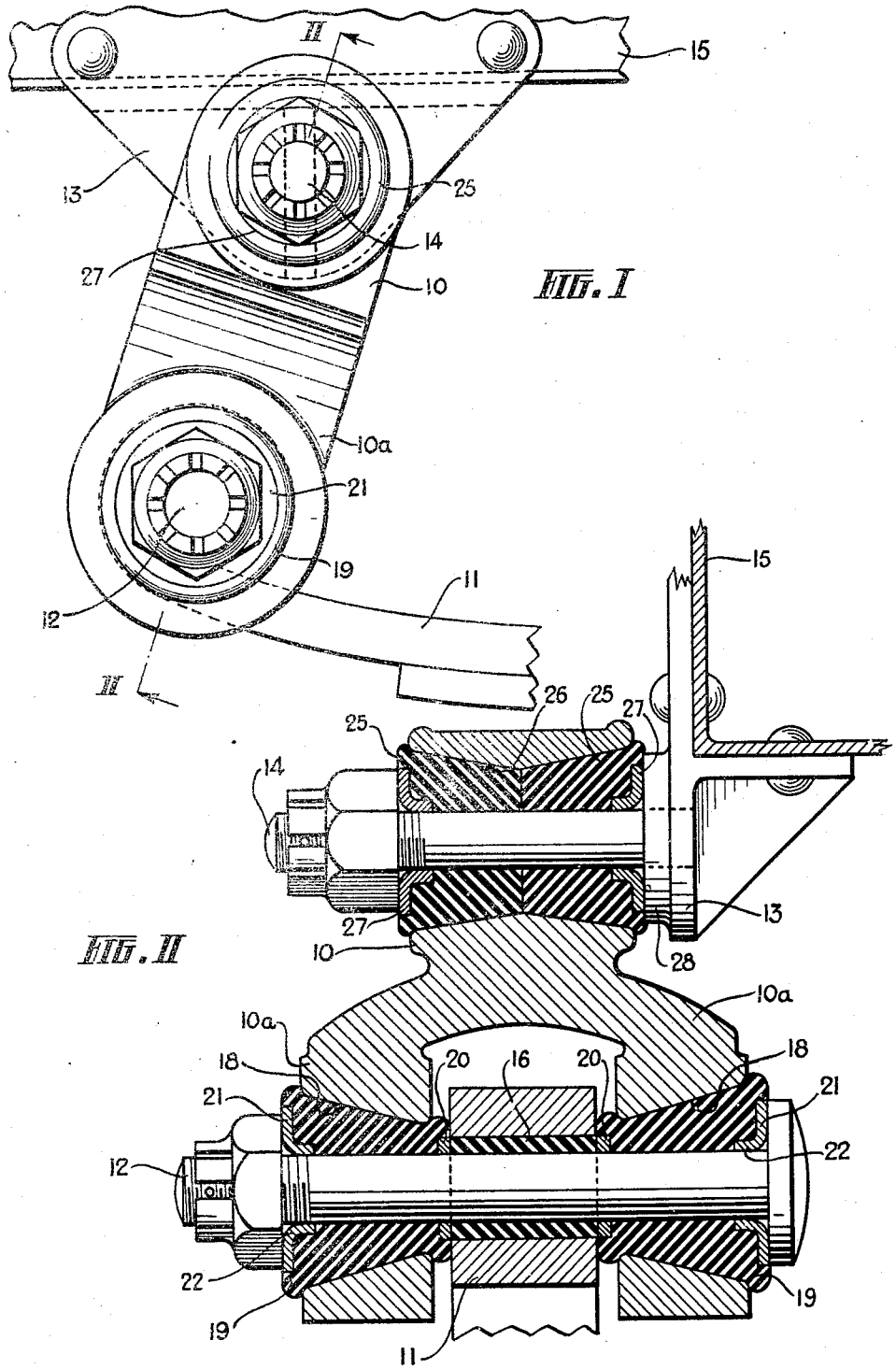
INVENTOR
RALPH L. KUSS
BY
Ely & Frye
ATTORNEYS

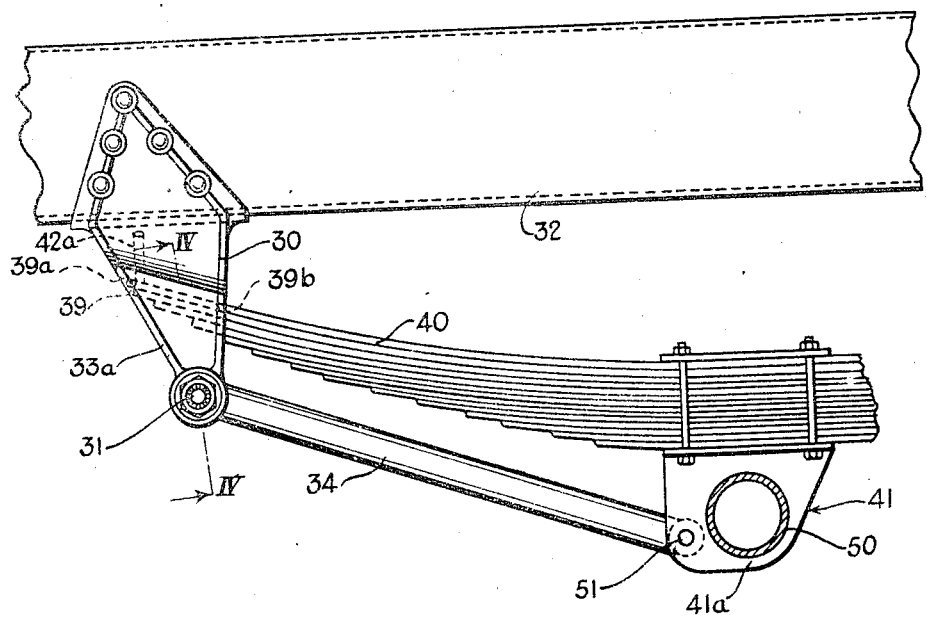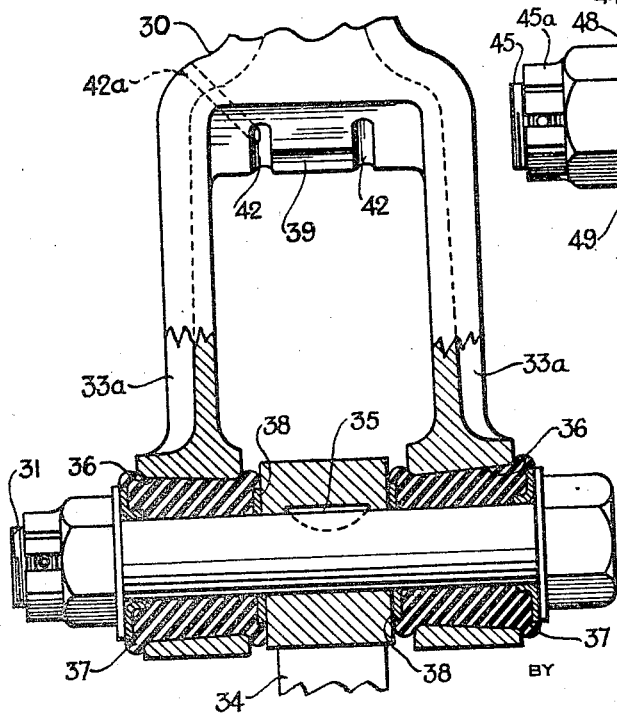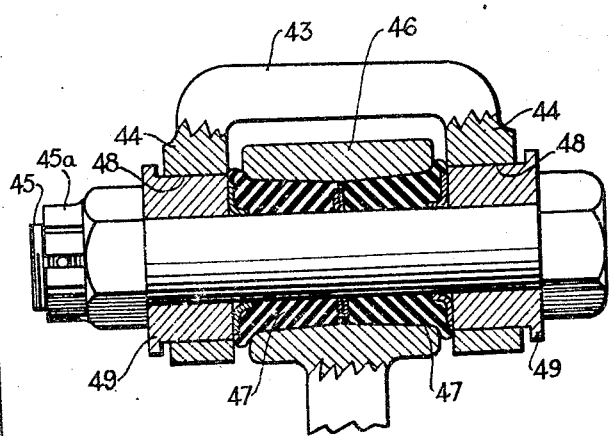

Patented Jan. 19, 1943

2,308,967

UNITED STATES PATENT OFFICE 2,308,967

BUSHING

Ralph L. Kuss, Cuyahoga Falls, Ohio, assignor to The Firestone Tire & Rubber Company, Akron, Ohio, a corporation of Ohio Application March 1, 1941, Serial No. 381,375

3 Claims. (Cl. 287—85)

This invention relates to bushings, and more especially it relates to rubber bushings such as may be used advantageously, for example, with the spring shackles and radius rods of motor vehicles, trailers, and the like.

Bushings of the character mentioned preferably are frusto-conical in shape and are received in complementally shaped bores or recesses in the spring shackles, said bushings being normally under compressive stress so as to function at maximum load-carrying capacity. Said capacity is reduced, however, in cases where the construction is such as to permit substantial flow or displacement of the rubber of the bushing structures, and it is to the relief of this condition that this invention primarily is directed.

The chief objects of the invention are to provide improved rubber shackle bushings of the character mentioned; and to provide rubber shackle bushings of increased load-carrying capacity. More specifically the invention aims to provide rubber shackle bushings wherein the flowability of the rubber under load is determinately limited. Other objects will be manifest as the description proceeds.

Of the accompanying drawings:

Figure I is an elevation of a spring shackle operatively interposed between a leaf spring and a hanger, and the improved bushings interposed between the shackle and spring and the shackle and hanger;

Figure II is a section on line II—II of Figure I.

Figure III is an elevation of a spring bracket, and the improved bushings interposed between the bracket and a torque rod connecting said bracket to a spring mounting.

Figure IV is a section on line IV—IV of Figure III.

Figure V is a section showing another embodiment of the invention.

Referring to the drawings, there is shown a spring shackle 10 that is pivotally connected at its lower end to a leaf spring 11 through the agency of a shackle bolt 12, and is pivotally connected at its upper end to a hanger 13 through the agency of a stud bolt 14 that projects laterally from the latter, said hanger being secured to a side rail 15 of the frame of a vehicle in the usual manner. The lower end portion of the shackle 10 is bifurcated or forked to provide arms 10a that receive the shackle bolt 12. The eye of the leaf spring 11 encircles the shackle bolt 12 between said arms 10a, and a rubber bushing 16 is interposed between the spring eye and the shackle bolt, said bushing being under compressive stress so that there is no relative movement between the surface of the bushing, the surface of the spring eye and the surface of the shackle bolt during operation of structure. All relative movement between the eye of the leaf spring 11 and the bolt 12 is permitted by reason of distortion of the rubber bushing 16.

The shackle bolt 12 is yieldingly connected to the shackle, and to this end the respective arms 10a of the shackle are formed with coaxial frusto-conical bores 18, 18, the small ends of said bores being in the confronting faces of said arms 10a. Mounted in said bores 18 are respective frusto-conical bushings 19 that are axially apertured to receive the shackle bolt 12, said bushings being of greater axial length than the thickness of the arms 10a so as to project beyond the lateral faces of the latter. Molded into each bushing 19, at the small end thereof, is an annular metal insert 20 that extends radially outwardly from the bore of the bushing, and covers a major portion but not all of the end face of the bushing. However, this metal insert 20 may be omitted at this position without appreciably reducing the advantages of the present invention. When the bushings 19 are in the operative positions shown in Figure II, the inserts 20 of said bushings laterally abut the respective ends of the rubber bushing 16 of the spring eye and assist in preventing lateral displacement or flow of the latter under stress. Molded into each bushing 19 at the large end thereof is a larger annular metal insert 21 that extends radially outwardly from axial bore of the bushing and covers the major portion but not all of said end face of the bushing. Each insert 21 also is formed on its inner circumference with an integral axially extending flange 22 that extends into rubber of the bushing a short, but appreciable distance. Both inserts 20 and 21 are secured to the rubber of the bushings 19 by being vulcanized thereto.

In operation, the tightening of the shackle bolt 12 urges the bushings 19 toward each other and wedges them into their respective tapered bores 18, with the result that the rubber of the bushings is placed under compressive stress such that relative angular movement between the outer surface of the bushings 19 and the surface of the shackle arms 10a and the inner surface of the bushings and shackle bolt 12 is prevented. Relative movement between the shackles bolt and the shackle, whether torsional, lateral, or axial, is yieldingly taken up by the bushings 19, and the capacity of the latter to accomplish the function mentioned is in direct proportion to the compressive stress under which they are maintained. By reason of the fact that the metal inserts are vulcanized to the rubber bushings, the tendency of the rubber to be squeezed outwardly from the center of the contact area between the rubber and the inserts is reduced and as a result the characteristic stiffness of the bushing is advantageously enhanced. The restriction of the flow of rubber also reduces the excessive "pinching action" at the outer ends of the bushing and consequently reduces the localized stresses in the rubber. The axial flange 22 of one of the inserts 21 also serves to keep the rubber out of the threads of the shackle bolt 12.

The stud bolt 14 is yieldingly connected to the shackle 10 through the agency of a pair of rubber bushings 25, 25 that are essentially similar to the bushings 19 hereinbefore described. Thus the bushings 25 are axially apertured to receive the stud bolt 14, and exteriorly are of frusto-conical in shape. The bushings 25 are received in a bore 26 in the shackle 10 which bore is flared or divergent toward its respective ends. The bushings 25 are of such length that when they are mounted in the bore 26 their small ends will be in abutting relation, their large ends projecting somewhat from the ends of said bore. Molded into the end faces of the bushings 25, at the large ends thereof, are respective annular metal inserts 27 that are identical to the inserts 21 of the previously described bushings 19. The inserts 20 of the latter are omitted from the bushing 25. The bushing 25 in one end of the bore 26 laterally abuts a boss 28 at the base of the stud bolt 14.

The other bushing 25 is engaged by the nut on the outer end of the stud bolt 14, and the setting up of said nut serves to place both bushings 25 under compressive stress, in which condition they function in exactly the same manner as bushing 19.

A modified form of an embodiment of the invention is shown in Figure III. In this modification, a rubber bushing of the type previously described is shown as applied to a radius rod of a vehicle, particularly a trailer, for positioning the axle 50 with respect to the frame.

A spring bracket 30 is attached to a frame member 32 in conventional manner, as by means of rivets. The lower end portion of the bracket 30 is bifurcated to provide arms 33a that receive a bolt 31. The eye of a radius rod 34 encircles the bolt 31 and is held in place by any suitable means such as a Woodruff key 35. The bracket arms 33a are formed with coaxial, frusto-conical bores 36 with the small ends of the bores in confronting relation. These conical bores of the bracket arms receive frusto-conical bushings 37 which are apertured to fit on the bolt 31. The bushings 37 are substantially identical to the bushings 19 described in connection with Figures I and II.

The opposite end of the radius rod 34 is pivotally connected to the axle 50 through the bracket 41 which may be welded thereto. The bracket 41 may have spaced flanges 41a, which perform the same function as the arms 33a of the bracket 30, to receive a bolt 51 to provide a pivotal connection between the radius rod and the bracket. The construction of this pivotal connection may be similar to the pivotal connection between the other end of the radius rod 34 and the bracket 30.

Between the bifurcated arms 33a, the bracket 30 is provided with an arcuate surface 39 to receive one end of the top surface of the leaf spring 40. The curvature of this surface and its relative association with the upwardly curved leaf spring 40 is such that in the unloaded position the spring contacts the surface 39 only at the points farthest removed from the axle 50. When the load is applied to the vehicle so that the spring 40 approaches the flattened condition, the spring will come into contact with the curved surface 39 progressively from the point 39a, for instance, to the point 39b. The opposite end of the spring (not shown) is supported in exactly the same way. It will be readily apparent therefore that as the spring is flexed to approach the flattened position the ends of the spring must also slide with respect to the brackets, since the radius rod 34 determines the longitudinal relative position between the axle 50 and the frame. For the purpose of lubricating the surface 39, suitable grooves 42 are provided. Lubrication may be supplied to these grooves through suitable bores 42a extending from the outside of the bracket 30 to the grooves 42. This construction provides a suspension in which the spring base is automatically decreased as the load increases to thereby produce an increase in spring rate as the load increases.

A further modified form of the invention is shown in Figure V, in which a suitable bracket 43 which may be attached to the vehicle frame, is provided with bifurcated arms 44 to receive a bolt 45. In this modification, rubber bushings 47, which are substantially identical with the rubber bushings 37 previously described, are disposed between the bolt 45 and the eye 46 of the radius rod. It is obvious that the eye 46 may be a spring eye if it is desired to pivotally connect a spring instead of a radius rod. The arms 44 are provided with cylindrical bores 48 which are large enough in diameter to permit the assembly of the rubber bushings 47 through the bores. Suitable bronze bushings 49 are adapted to fit the bores 48 and are apertured to fit on the bolt 45. When the nut 45a of the bolt 45 is tightened the bushings 49 will be forced inwardly against the bushings 47 and the outer edges of the latter bushings will expand radially to provide a flange of resilient material between the eye 46 and the bifurcated arms 44. It will be readily apparent that this will provide a pivotal connection between the eye 46 and the bracket 43, which will permit a certain amount of universal movement by reason of the distortion of the rubber bushing.

If desired, suitable splined connections may be provided between the bolt 45 and the bushings 49 and between the bushings 49 and the respective arms 44. The purpose of such splined connections is to localize the relative movement between the bracket 43 and the eye 46 about the axis of the bolt 45 in the rubber bushing. In this way, the relative pivotal movement would take place through distortion of the rubber bushing.

The detailed description of the particular embodiment of the invention illustrated and described herein is not to be construed as limiting the invention thereto. The invention includes all features of patentable novelty residing in the foregoing description and the accompanying drawings.

What is claimed is:

1. A bushing especially adapted for pivotal connections, said bushing comprising a rubber structure of frusto-conical shape formed with an axial bore, and a metal insert molded into the end face of the large end of the rubber structure, said insert covering a portion of said end face extending radially outwardly from said axial bore, and formed at its inner circumference with an axially extending flange that is embedded in the rubber structure and vulcanized thereto contiguous with the axial bore therein, locally at one end of said bore.

2. A bushing especially adapted for shackles, said bushing comprising a rubber structure of frusto-conical shape formed with an axial bore, and metal inserts molded into the respective end faces of the rubber structure contiguous with the bore thereof, said inserts covering the major portions of said end faces, the metal insert in the larger end of the rubber structure being formed on its inner circumference with an axially extending flange that is locally embedded in the rubber structure at the end thereof.

3. A pivotal connection comprising a pair of spaced apart supporting elements formed with axially aligned tapered bores having their smaller ends confronting each other, respective frusto-conical rubber bushings formed with axial apertures and mounted in said bores, a bolt extending through the axial apertures of said bushings adapted to apply axially directed pressure thereagainst, a cylindrical rubber bushing mounted on said bolt between said frusto-conical bushings, a supported member circumscribing said cylindrical bushing and exerting compressive stress thereon and annular metal inserts in the smaller end faces of the frustro-conical bushings, said inserts abutting the end faces of the cylindrical bushing.

RALPH L. KUSS.